UNITED STATES PATENT OFFICE.

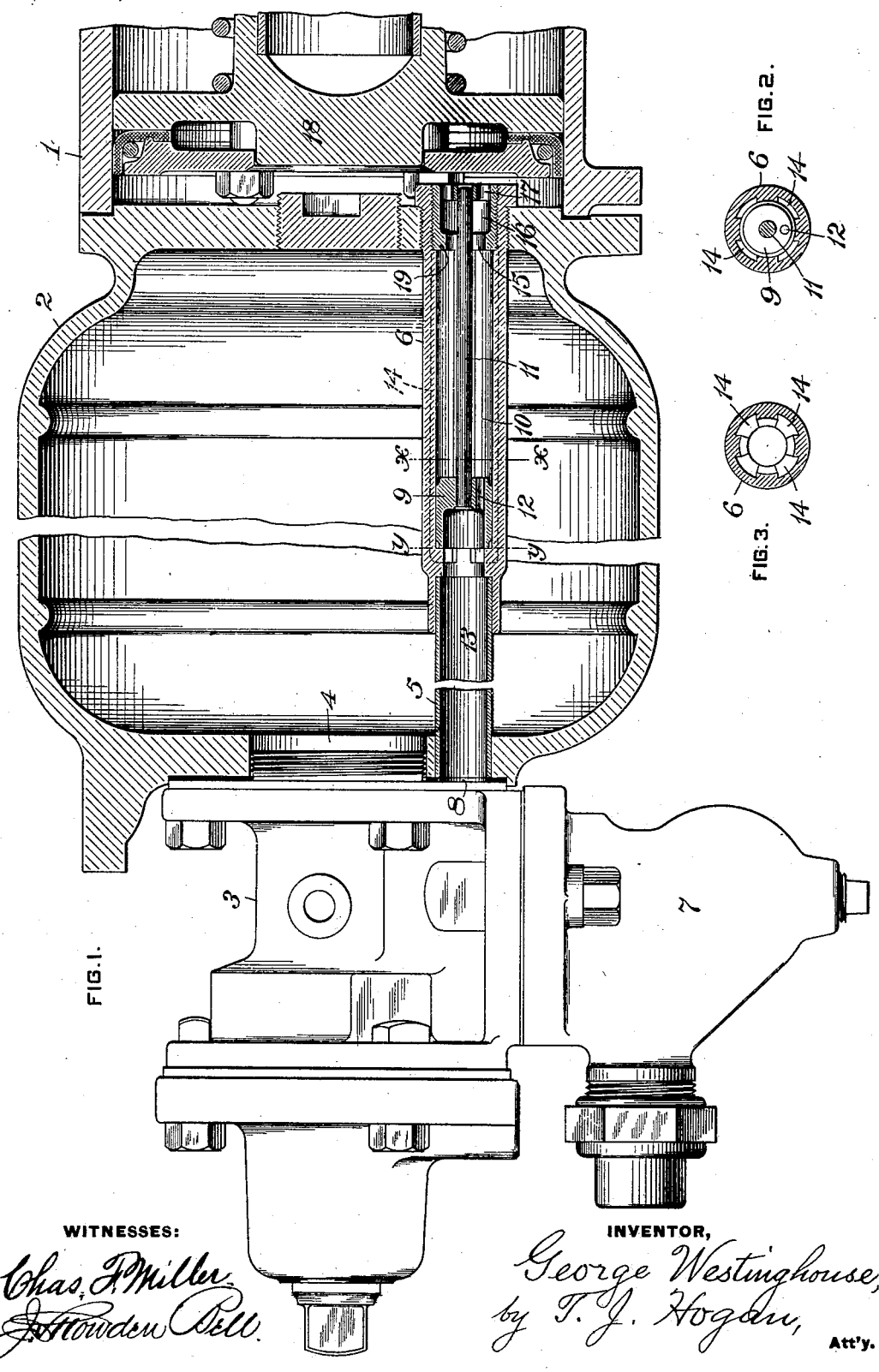

GEORGE WESTINGHOUSE, OF PITTSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

AUTOMATIC FLUID-PRESSURE BRAKE APPARATUS.

SPECIFICATION forming part of Letters Patent No. 699,267, dated May 6, 1902.

Application filed February 25, 1897. Serial No. 625,034. (No model.)

*To all whom it may concern:*

Be it known that I, GEORGE WESTINGHOUSE, a citizen of the United States, residing at Pittsburg, in the county of Allegheny and State of Pennsylvania, have invented or discovered a certain new and useful Improvement in Automatic Fluid-Pressure Brake Apparatus, of which improvement the following is a specification.

The object of my invention is to provide an improvement in automatic fluid-pressure brake apparatus; and to this end my invention consists in means for controlling, regulating, or modifying the action of the fluid under pressure in emergency applications of the brakes and in certain combinations and features of construction, all as hereinafter fully set forth.

In the accompanying drawings, which illustrate an application of my invention, Figure 1 is a view, partly in section and partly in elevation, showing a brake-cylinder, an auxiliary reservoir, and a triple-valve device with my improvement applied thereto, the brake-cylinder and auxiliary reservoir being shown in section and the triple-valve device in elevation; Fig. 2, a section on the line $x\ x$ of Fig. 1 as seen from the right, and Fig. 3 a section on the line $y\ y$ of Fig. 1.

The greater force applied to the air-brake pistons in emergency applications, as well as the greater rapidity with which the higher pressure is obtained in the brake-cylinders, is usually due to the local release of fluid from the train-pipe on each car whether the discharge of fluid from the train-pipe is to the brake-cylinder or to the atmosphere or elsewhere; but the additional pressure and the more rapid accumulation of pressure may be directly obtained either by the admission of fluid from the train-pipe to the brake-cylinder, in addition to the fluid from the auxiliary reservoir, or by a greater or more rapid admission of fluid to the brake-cylinder from the auxiliary reservoir only, or by the admission to the brake-cylinder of additional fluid from a supplemental or other additional reservoir, or by an admission of fluid from any or all of these sources of fluid under pressure.

The employment of my improvement is not limited to a brake apparatus in which the emergency application of the brakes is effected by a local release of fluid from the train-pipe under each car or in which the fluid so released is discharged into the brake-cylinder; but in the drawings I have shown it in combination with such apparatus. The brake-cylinder 1, auxiliary reservoir 2, and triple-valve device 3 are of the general form and arrangement usually employed in a Westinghouse quick-action brake apparatus for freight-cars. The main-valve chamber of the triple device 3 is in communication with the auxiliary reservoir 2 through the opening 4 in one end of the reservoir, and the brake-cylinder passage of the triple-valve device is in communication with the brake-cylinder through the pipes 5 and 6. The main valve of the triple-valve device in service applications admits fluid under pressure from the auxiliary reservoir 2 through the pipes 5 and 6 to the brake-cylinder, and in emergency applications fluid under pressure is admitted to the brake-cylinder through the pipes 5 and 6 from the auxiliary reservoir by the main valve of the triple-valve device and from the train-pipe by the quick-action valve located in the cap 7.

In the construction heretofore employed a single unobstructed pipe 5 extended across the auxiliary reservoir 2 and connected the brake-cylinder port 8 of the triple-valve device with the brake-cylinder. In accordance with my present invention I have shown means whereby in emergency applications the sudden accumulation of pressure beyond a certain degree at the beginning of an application may be prevented or hindered, while a greater degree of pressure may be obtained after the beginning of the application.

The pipes or tubular portions 5 and 6 may, if preferred, be made integral with one another—that is, a single pipe or tube may be employed instead of these two parts, which are constructed as shown in the drawings only for convenience, or a passage may be formed in the wall or casing or outside of the reservoir, as in the arrangement usually employed in the equipment of passenger-cars. As shown, a piston 9 is fitted in the passage 10 of the tubular portion 6 and is adapted to slide therein under the action of fluid-pressure in the application of the brakes.

In making a service application of the brakes the fluid under pressure, which is admitted by the main valve of the triple device to the passage 13, may pass around the piston 9, through the passages 14, and through the passage 12 in the piston 9, and thence through the passages 10, 15, 16, and 17 to the brake-cylinder. As the piston 9 is moved by the flow of fluid to the right its stem 11 bears on the piston 18 in the brake-cylinder 1 until the piston 9 comes into contact with the screw-plug 19, which forms a guide for the stem 11. When the piston 9 bears on the shoulder formed by the plug 19, the passage of fluid around the piston 9 through the passages 14 is cut off, and the further admission of fluid to the brake-cylinder is through the passage 12 in the piston 9, the capacity of the passage 12 being as great as that of the service-port of the triple-valve device or such as may be required for a service application of the brakes when the passage of fluid around the piston 9 through the passages 14 is cut off. When the brakes are released, the piston 9 is returned to the position shown in the drawings by the movement of the brake-cylinder piston 18 and the action of the escaping fluid on the piston 9.

It will be seen that with the construction and operation shown and described my improvement has no material effect on a service application of the brakes. The seating of the piston 9 on the screw-plug 19 and the cutting off of the flow around the piston 9 do not diminish the flow to the brake-cylinder in such an application, since the capacity of the passage 12 is at least as great as that of the service-port of the triple valve; but under my invention such a cut off of the flow around the piston 9 or a similar limitation of the flow to the brake-cylinder is of importance in emergency applications, and in order to permit the seating of the piston 9 on the screw-plug 19 it is essential that the travel of the piston 18 should be sufficiently great.

In making an emergency application of the brakes fluid under pressure is released from the auxiliary reservoir and from the train-pipe to the passage 13 and passes through the passages 14 around the piston 9 to the brake-cylinder, the capacity of these passages being sufficient to permit the desired flow from both the train-pipe and the auxiliary reservoir. When the brake-cylinder piston 18 has moved to the right far enough to permit the piston 9 to seat on the screw-plug 19, the flow through the passages 14 to the brake-cylinder will be cut off, and the only passage through which the fluid may thereafter flow to the brake-cylinder will be the passage 12; but the capacity of this passage is so limited as compared with the capacity of the passage through which the fluid is released from the train-pipe or as compared with the combined capacity of the train-pipe release-passage and the port of the triple valve through which fluid is released that a rapid accumulation of pressure is effected on the left of the piston 9 as soon as the flow through the passages 14 is cut off. The discharge of fluid into the brake-cylinder, which thereafter takes place through the passage 12 only, will be limited in accordance with the size of the passage 12, and the accumulation of pressure on the left of the piston 9 will act to close the check-valve, which is usually located between the train-pipe and the brake-cylinder port 8 of the triple-valve device, and the release from the train-pipe will be cut off; but the flow from the auxiliary reservoir to the brake-cylinder through the passage 12 will continue until the auxiliary reservoir and brake-cylinder pressures have equalized. The amount of fluid released from the train-pipe and also the quantity of fluid admitted to the cylinder at the beginning of the emergency application will be less than with the apparatus heretofore employed and the force of the application will be somewhat less; but the application of the greatest pressure to the brake-cylinder piston instead of being completed, or nearly so, on each car before the application of pressure to the piston on the next succeeding car or when but a slight degree of pressure has been applied to the piston on the next succeeding car will be taking place at the same time on all of the cars, although at any instant before the application is completed the pressures in all the cylinders may not be exactly identical. The cut off of the flow through the passages 14, which passages are intended only to provide for the greater flow of fluid which takes place in emergency applications, will be effected before the piston 18 reaches the end of its stroke, and the point in the stroke of the piston 18 at which this cut off is effected will depend on the relative length of stroke of the pistons 18 and 9 and the length of the stem 11. If preferred, these dimensions may be made variable by making the screw-plug 19 and the length of the stem 11 adjustable or by making the stem 11 adjustable in the piston 9.

While the action of the fluid at the beginning of an application is by my improvement modified so as to prevent injurious or objectionable effects, the quickness or simultaneity of application on all the cars of a train will be undiminished, since the quantity of fluid released from the train-pipe on each car will still be great enough to quickly effect an emergency application of the valve devices on the next car, and the outward movement of the brake-cylinder piston, while it may be effected with a somewhat lessened force, will not be appreciably slower.

I claim as my invention and desire to secure by Letters Patent—

1. In an automatic fluid-pressure brake apparatus, the combination, with a series of brake-cylinders, of means for regulating or limiting the flow of fluid from an emergency-valve device to the brake-cylinders in emergency applications, whereby the application of the higher degrees of pressure to the brake-cylinder piston may be effected substantially simultaneously on all of the cars of a train, substantially as set forth.

2. In an automatic fluid-pressure brake apparatus, the combination, with a brake-cylinder, of means for automatically limiting discharge of fluid from the train-pipe by retarding its flow into the brake-cylinder.

3. In an automatic fluid-pressure brake apparatus, the combination, with a brake-cylinder, and means for permitting a greater flow of fluid thereto in emergency applications than in service applications, of means for restricting the flow from the train-pipe and auxiliary reservoir in emergency applications after the application has commenced, or before the piston has completed its stroke, substantially as set forth.

4. In an automatic fluid-pressure brake apparatus, the combination, with a brake-cylinder, of means for permitting a limited flow of fluid under pressure from the auxiliary reservoir to the brake-cylinder in service applications and a greater flow from the auxiliary reservoir and train-pipe in emergency applications, of means whereby the greater flow of fluid from the reservoir and train-pipe in emergency applications may be reduced before the piston in the brake-cylinder has completed its stroke, substantially as set forth.

5. In an automatic fluid-pressure brake apparatus, the combination, with a brake-cylinder, of means for permitting a comparatively limited flow of fluid to the brake-cylinder in service applications, and a greater flow in emergency applications, and means operated by the flow of fluid from the auxiliary reservoir and train-pipe to the brake-cylinder for reducing the flow thereto, substantially as set forth.

6. In an automatic fluid-pressure brake apparatus, the combination, with a brake-cylinder, and a triple-valve device, of a passage from the triple-valve device to the brake-cylinder through which fluid may pass when released from the auxiliary reservoir and train-pipe, and means whereby the capacity of the passage may be restricted in emergency applications, substantially as set forth.

In testimony whereof I have hereunto set my hand.

GEO. WESTINGHOUSE.

Witnesses:
CHAS. F. MILLER,
J. SNOWDEN BELL.